(12) United States Patent
Matsumoto

(10) Patent No.: US 11,161,254 B2
(45) Date of Patent: Nov. 2, 2021

(54) ROBOT HAND

(71) Applicant: FANUC CORPORATION, Yamanashi (JP)

(72) Inventor: Ryou Matsumoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 165 days.

(21) Appl. No.: 16/542,499

(22) Filed: Aug. 16, 2019

(65) Prior Publication Data

US 2020/0078960 A1 Mar. 12, 2020

(30) Foreign Application Priority Data

Sep. 7, 2018 (JP) .............................. JP2018-167717

(51) Int. Cl.
*B25J 15/10* (2006.01)

(52) U.S. Cl.
CPC ........... *B25J 15/103* (2013.01); *B25J 15/106* (2013.01)

(58) Field of Classification Search
CPC .... B25J 15/103; B25J 15/106; B25J 15/0293; B25J 15/10; B25J 15/02; B25J 15/00
See application file for complete search history.

(56) References Cited

U.S. PATENT DOCUMENTS

| 3,901,547 A * | 8/1975 | Skinner, II | B25J 15/103 |
| | | | 294/195 |
| 4,351,553 A * | 9/1982 | Rovetta | B25J 15/0009 |
| | | | 294/106 |
| 5,052,736 A | 10/1991 | Loncaric et al. | |
| 5,150,937 A * | 9/1992 | Yakou | B25J 9/1612 |
| | | | 294/119.1 |
| 9,550,297 B2 * | 1/2017 | Saadat | B25J 15/0028 |
| 2012/0205932 A1 * | 8/2012 | Moto | B25J 15/10 |
| | | | 294/213 |
| 2014/0103676 A1 * | 4/2014 | Nammoto | B25J 15/0009 |
| | | | 294/213 |

FOREIGN PATENT DOCUMENTS

| JP | S57-166690 U | 10/1982 |
| JP | S60-190591 U | 12/1985 |
| JP | H01-240249 A | 9/1989 |
| JP | H02-298487 A | 12/1990 |
| JP | H03-294197 A | 12/1991 |

(Continued)

OTHER PUBLICATIONS

Japanese Office Action dated Oct. 6, 2020, in connection with corresponding JP Application No. 2018-167717 (9 pp., including machine-generated English translation).

*Primary Examiner* — Stephen A Vu
(74) *Attorney, Agent, or Firm* — Maier & Maier, PLLC

(57) ABSTRACT

A robot hand includes three or more holding portions arranged at intervals from each other along a circumferential direction about a predetermined axis, and configured to hold a work piece, and a driving portion configured to move the three or more holding portions toward a closing direction for approaching the axis and toward an opening direction for moving away from the axis, wherein at least one of the holding portions is swingable, about the axis, at a position at which the at least one holding portion is in contact with the work piece.

7 Claims, 5 Drawing Sheets

(56) References Cited

FOREIGN PATENT DOCUMENTS

| JP | H04-115893 A | 4/1992 |
| JP | 2002-361588 A | 12/2002 |
| JP | 2005-144575 A | 6/2005 |
| JP | 2007-105878 A | 4/2007 |
| JP | 2011-183474 A | 9/2011 |

* cited by examiner

ROBOT HAND

CROSS-REFERENCE TO RELATED APPLICATIONS

This application is based on and claims priority to Japanese Patent Application No. 2018-167717 filed on Sep. 7, 2018, the content of which is incorporated herein by reference in its entirety.

FIELD

The present invention relates to a robot hand.

BACKGROUND

Conventionally, a robot hand attached to a conveyance robot is changed according to a work piece to be conveyed. Robot hands are respectively designed for the types of work pieces according to shapes and dimensions of the corresponding work pieces. Therefore, it is necessary to manufacture a plurality of types of robot hands, which can be costly. In particular, processing for a holding portion in a three-dimensional shape according to the shape of the work piece is expensive. Further, a space for storing a large number of robot hands is required.

In order to solve such inconveniences, a robot hand capable of accommodating various types of work pieces has been devised (cf. Japanese Unexamined Patent Application Publication No. 2007-105878; Japanese Unexamined Utility Model Application Publication No. S60-190591; Japanese Unexamined Patent Application Publication No. 2011-183474; Japanese Unexamined Patent Application Publication No. 2005-144575; Japanese Unexamined Utility Model Application Publication No. S57-166690; Japanese Unexamined Patent Application Publication No. H02-298487; and Japanese Unexamined Patent Application Publication No. H03-294197).

SUMMARY

One aspect of the present invention provides a robot hand including: three or more holding portions arranged at intervals from each other along a circumferential direction about a predetermined axis, and configured to hold a work piece; and a driving portion configured to move the three or more holding portions toward a closing direction for approaching the predetermined axis and toward an opening direction for moving away from the predetermined axis, wherein at least one of the holding portions is swingable, about the predetermined axis, at a position at which the at least one holding portion is in contact with the work piece.

A robot hand according to this aspect holds and releases the work piece by opening and closing the three or more holding portions. Specifically, if the hand is of an inner diameter chuck type, an inner surface of the work piece is held by opening the holding portions disposed within the work piece of a tubular shape, and is released by closing the holding portions. If the hand is of an outer diameter chuck type, an outer surface of the work piece is held by closing the holding portions disposed outside the work piece, and is released by opening the holding portions.

DETAILED DESCRIPTION

Hereinafter, a robot hand 1 according to one embodiment of the present invention will be described with reference to the drawings.

Figure 1:
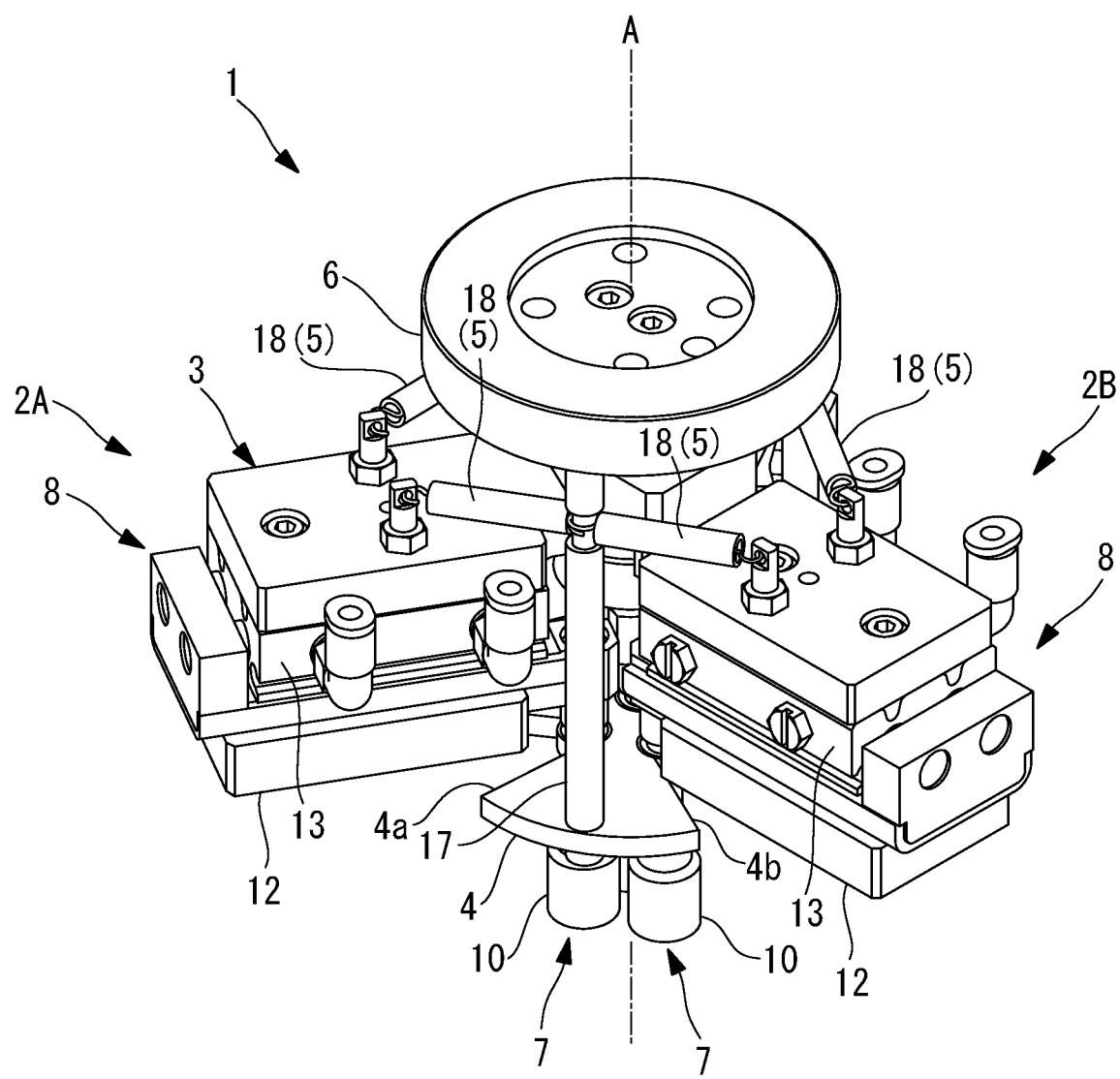
FIG. 1 is a perspective view of a robot hand, seen from above, according to one embodiment of the present invention.
Figure 2:
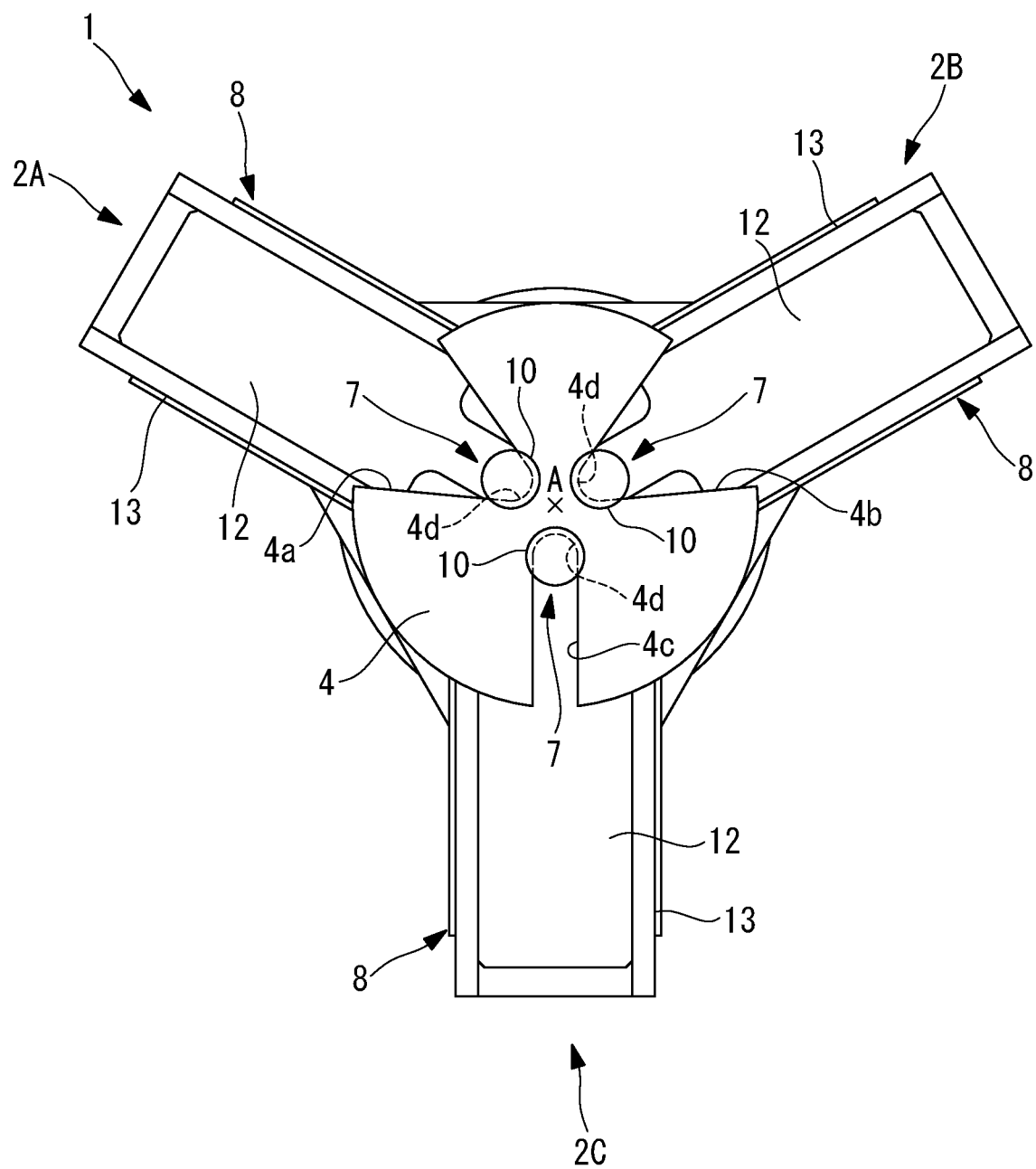
FIG. 2 is a schematic plan view of the robot hand in FIG. 1, seen from below.

The robot hand 1 according to this embodiment is an inner diameter chuck type hand for holding an inner surface of a tubular work piece. As shown in FIG. 1 and FIG. 2, the robot hand 1 includes: three holding units 2A, 2B, and 2C arranged at intervals from each other along a circumferential direction about a predetermined central axis A; a swing support mechanism 3 that supports the two holding units 2A and 2B swingably about the central axis A; a swing restricting member 4 that mechanically restricts swinging movement of the two holding units 2A and 2B within a range of a predetermined angle; urging members 5 that urge the two holding units 2A and 2B respectively to predetermined neutral positions; and a hand flange 6 for attaching the robot hand 1 to a robot.

Here, the number of the holding units provided for the robot hand 1 may be 4 or more. Further, the number of holding units that are swingable may be just one, or may be three or more.

The hand flange 6 is a portion at which the hand is attached to and removed from the robot, and in a disc shape that is coaxial with the central axis A. Hereinafter, a side of the hand flange 6 in a direction along the central axis A is defined to be an upper side of the robot hand 1, and a side opposite of the hand flange 6 (a side of a holding portion 7) is defined to be a lower side of the robot hand 1.

Each of the holding units 2A, 2B, and 2C includes the holding portion 7, and a driving portion 8 for linearly moving the holding portion 7.

The holding portion 7 includes a shaft 9 parallel to the central axis A, a tip portion 10 fixed to a lower end of the shaft 9, and an annular or cylindrical rotating member 11 attached to an outer peripheral surface of the shaft 9.

The tip portion 10 is a portion that is brought into close contact with an inner surface of a work piece, when the work piece is held.

The rotating member 11 is supported by the shaft 9 rotatably about a longitudinal axis of the shaft 9. For example, the rotating member 11 is an outer ring of a bearing. The inner ring of the bearing is fixed to an outer peripheral surface of the shaft 9, and an outer ring of the bearing is rotatable with respect to the shaft 9 about the longitudinal axis of the shaft 9. In a direction parallel to the central axis A, the rotating member 11 is disposed at the same position as the swing restricting member 4 described later, and the holding portion 7 is brought into contact with the swing restricting member 4 via the rotating member 11.

The driving portion 8 supports the upper end of the shaft 9, and moves the holding portion 7 to a closing direction to which the holding portion 7 approaches the central axis A and to an opening direction to which the holding portion 7 is moved away from the central axis A. The closing direction and the opening direction are in a direction perpendicular to the central axis A.

Figure 3:
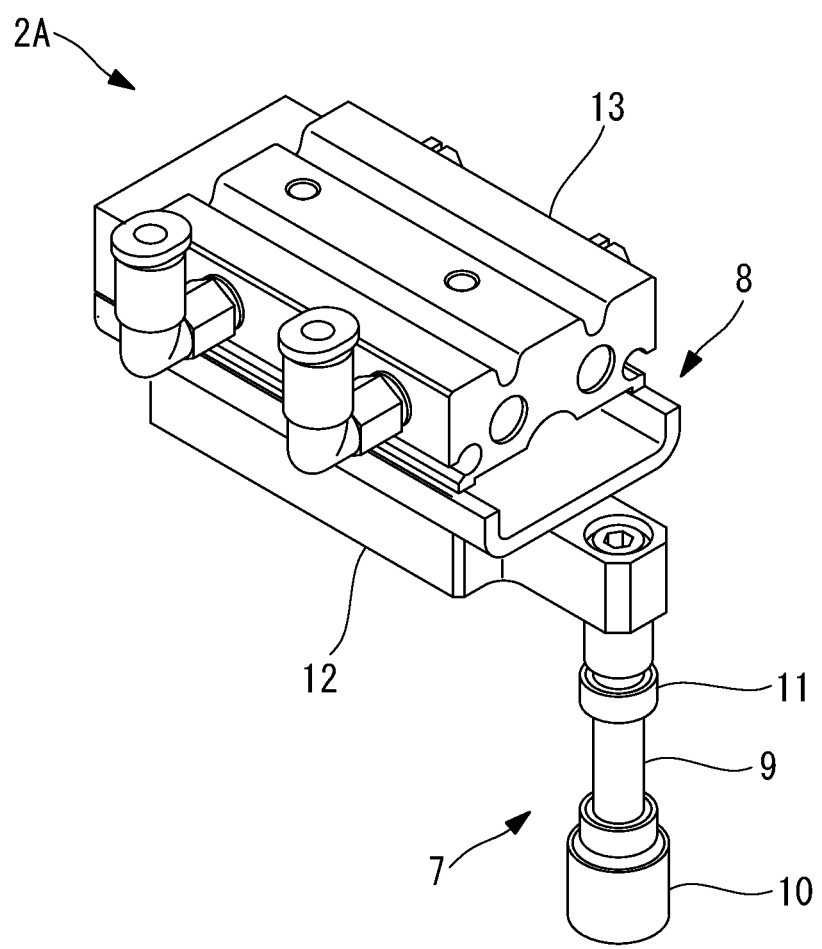
FIG. 3 is a perspective view of a holding unit, seen from above, provided for the robot hand in FIG. 1.

In one example, as shown in FIG. 3, the driving portion 8 includes a slider 12 to which the upper end of the shaft 9 is fixed, and an air cylinder 13 that moves the slider 12 linearly to the opening direction and to the closing direction. Each of the three air cylinders 13 includes a first port and a second port connected to an air circuit (not shown). By supplying air simultaneously to the first ports of the three air cylinders 13 via the air circuit, the three holding portions 7 move to the opening direction in synchronization with each other, and thus the three holding portions 7 are opened. Further, by supplying air simultaneously to the second ports of the three air cylinders 13 via the air circuit, the three holding portions 7 move to the closing direction in synchronization with each other, and thus the three holding portions 7 are closed.

It should be noted that each of the driving portions 8 may include different means, such as a step motor, for moving the holding portion 7 linearly using air or electricity as power source, in place of the air cylinder 13.

Figure 4:
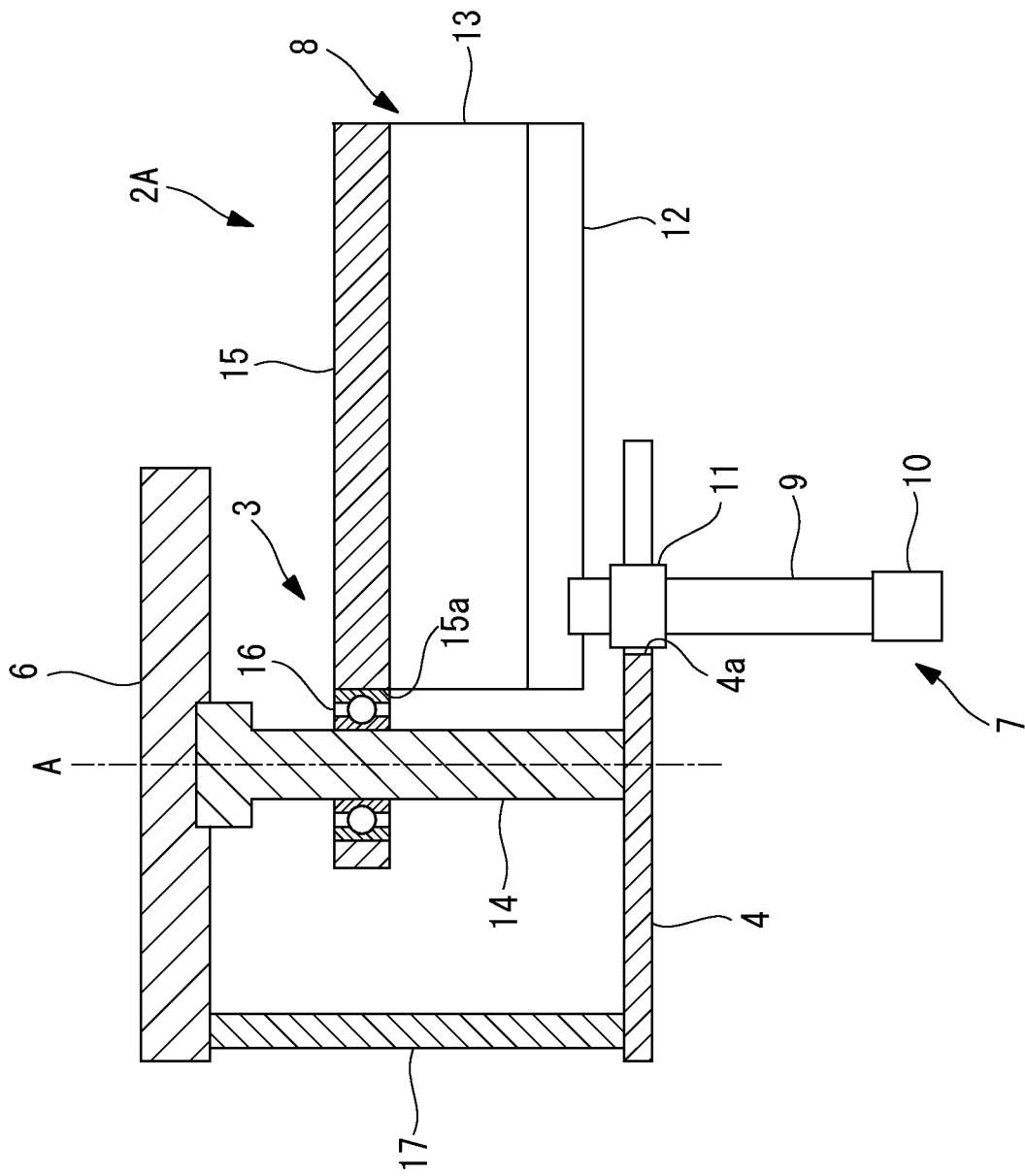
FIG. 4 is a schematic cross-sectional view showing a configuration of a swing support mechanism of the robot hand in FIG. 1.

As shown in FIG. 4, the swing support mechanism 3 supports the two holding units 2A and 2B swingably about a central shaft 14 coaxial with the central axis A. The central shaft 14 extends downward from a lower surface of the hand flange 6. The swing support mechanism 3 may support the remaining holding unit 2C swingably about the central axis A.

Specifically, the swing support mechanism 3 includes a plate 15 supported by the central shaft 14 via a shaft bearing 16. FIG. 4 only shows the swing support mechanism 3 of one holding unit 2A. The plate 15 extends in a direction perpendicular to the central axis A, the holding unit 2A is fixed to one end of the plate 15, and a hole 15a through which the central shaft 14 penetrates is provided at the other end of the plate 15. The shaft bearing 16 is positioned between an inner surface of the hole 15a and an outer surface of the central shaft 14. By the shaft bearing 16, the plate 15 and the holding unit 2A are supported swingably about the central axis A according to an external force about the central axis A.

The swing restricting member 4 is a plate-shaped member disposed at a position between the tip portion 10 and the driving portion 8 in the direction along the central axis A. The swing restricting member 4 is fixed to a lower end of the central shaft 14, and disposed in a direction perpendicular to the central axis A. As shown in FIG. 2, the swing restricting member 4 has three openings 4a, 4b, and 4c arranged at equal intervals along the circumferential direction. Each of the openings 4a, 4b, and 4c penetrates the swing restricting member 4 in a through-thickness direction, and the shaft 9 passes through each of the openings 4a, 4b, and 4c in a direction parallel to the central axis A.

In a planar view seen in a direction along the central axis A, each of the two openings 4a and 4b respectively corresponding to the holding units 2A and 2B takes a shape whose width is tapered toward the central axis A to form a substantial triangle having one apex positioned on a side of the central axis A. The openings 4a and 4b close on the side of the central axis A, and open on a side opposite of the central axis A. By the opening 4a having the width wider than that of the shaft 9 in the state in which the shafts 9 are disposed outwardly from the apices, the shaft 9 is allowed to swing about the central axis A within an angular range defined by the width of the opening 4a.

In a planar view seen in the direction along the central axis A, the opening 4c corresponding to the holding unit 2C takes a substantial rectangular shape radially extending straight toward the central axis A. The opening 4c closes on the side of the central axis A, and opens on a side opposite of the central axis A. The opening 4c has a constant width slightly wider than that of the shaft 9, and configured to prevent the shaft 9 from swinging about the central axis A within the opening 4c.

FIG. 2 shows a closed state in which the three holding portions 7 are located at standby positions that are closest to the central axis A. In the closed state, the three holding portions 7 are positioned at the narrowed portions 4d, respectively, at ends of the openings 4a, 4b, and 4c on the side of the central axis A. A width of the narrowed portion 4d of each of the openings 4a, 4b, and 4c is substantially equals to an outer diameter of the shaft 9, and prevents the shaft 9 from swinging about the central axis A in both directions. Therefore, in the closed state, each of the holding portions 7 is held stably at the standby position.

Each of the holding units 2A and 2B is urged by the urging member 5 at a predetermined neutral position along the circumferential direction about the central axis A. When the holding units 2A and 2B are at the neutral positions, it is preferable that the three holding units 2A, 2B, and 2C are arranged at regular intervals along the circumferential direction about the central axis A. Examples of the urging member 5 include a coiled spring. When an external force about the central axis A is applied upon the holding units 2A and 2B, the holding units 2A and 2B swing about the central axis A against an urging force of the urging member 5. On the other hand, when no external force about the central axis A is applied upon the holding units 2A and 2B, or when the external force is small, each of the holding units 2A and 2B is held at the neutral position by the urging force of the urging member 5. With this, it is possible to prevent the holding units 2A and 2B from swinging unnecessarily.

In the illustrated example, the holding units 2A and 2B are urged by a pair of urging members 5 contained within a sheath 18. At both ends of each of the holding units 2A and 2B along the circumferential direction, a pair of support shafts 17 extending, parallel to the central axis A, between the hand flange 6 and the swing restricting member 4. The holding units 2A and 2B are coupled to the pair of support shafts 17 by the pair of urging members 5. One of the urging members 5 urges the holding unit 2A or 2B in a clockwise direction about the central axis, and the other of the urging members 5 urges the holding unit 2A or 2B in a counter-clockwise direction about the central axis.

Here, the holding units 2A and 2B may be urged by a single urging member 5.

When the remaining holding unit 2C is swingable, the holding unit 2C may also be urged by the pair of urging members 5 or the single urging member 5.

Next, effects of the robot hand 1 will be described.

The robot hand 1 according to this embodiment is attached to a robot used for carrying work pieces. As one example, the robot is a 6-axis vertical articulated robot, and the hand flange 6 of the robot hand 1 is attached to a wrist flange at a tip end of a robot arm. In a state in which the robot hand 1 is attached to the wrist flange, the central axis A of the robot hand 1 coincides a central axis (sixth axis) of the wrist flange. The robot may be a robot of a different type, such as a parallel link robot.

By an operation of the robot, the three holding portions 7 of the robot hand 1 in the closed state are inserted into a tubular work piece. Next, the three holding portions 7 are opened by supplying air through the first port of the air cylinder 13 of the driving portion 8, and the three tip portions 10 are closely attached to an inner surface of the work piece to hold the work piece.

At this time, the two holding units 2A and 2B are swingable about the central axis A, and urged in the neutral positions by the urging members 5. Therefore, in a process of opening, the holding portions 7 of the two holding units 2A and 2B move linearly along the neutral positions in the opening direction until the holding portions 7 reach the inner surface of the work piece, and then after the holding portions 7 reach the inner surface of the work piece, move in the opening direction following a shape of the inner surface of the work piece while passively swinging about the central axis A. On the other hand, as the one holding unit 2C is not able to swing about the central axis A, the holding portion 7 of the holding unit 2C only moves linearly in the opening direction, and a position of the holding portion 7 of the holding unit 2C along the circumferential direction about the central axis A is constant.

Next, the robot hand 1 holding the work piece is carried to a carrying position by the operation of the robot. Then, the three holding portions 7 are closed by supplying air through the second port of the air cylinder 13 of the driving portion 8. With this, the work piece is released from the robot hand 1, and placed at the carrying position. In a process of closing the three holding portions 7, the holding portions 7 of the two holding units 2A and 2B swing about the central axis A following the urging force of the urging member 5, and return to the neutral positions.

As described above, according to this embodiment, at the positions at which the holding portions can be in contact with the work piece (positions outward from the narrowed portions 4d), two of the three holding portions 7 are swingable individually from each other about the central axis A. Further, in the process of opening the three holding portions 7, relative positions of the three holding portions 7 change according to a shape and dimensions of the inner surface of the work piece. With this, it is possible to adjust the relative positions of the three holding portions 7 automatically to appropriate positions according to the shape and dimensions of the work piece. Specifically, without adjustment of positions of the holding portions 7 by an operator or control of positions of the holding portion 7 by a controlling device that controls the robot hand 1, it is possible to realize adjustment of the positions of the three holding portions 7 according to the shape and dimensions of the work piece. Moreover, by the automatic adjustment of the relative positions of the three holding portions 7, it is advantageous that it is possible to stably hold a work piece of various types with different shapes and dimensions without replacing the robot hand 1 attached to the robot.

Further, one of the three holding portions 7 is not able to swing about the central axis A, and swing of the remaining two holding portions 7 is restricted within the openings 4a and 4b. In a case in which all of the three holding portions 7 are swingable, or in which swinging ranges of two of the holding portions 7 are not restricted, the three holding portions 7 may not be arranged evenly, and as a result, stability in holding the work piece may be reduced. According to this embodiment, it is possible to allow the relative positions of the three holding portions 7 an adequate degree of freedom, and thus to realize high stability in holding the work piece.

Moreover, the shaft 9 of each of the holding portions 7 is provided with the rotating member 11, and the shafts 9 of the openings 4a, 4b, and 4c are brought into contact with the swing restricting member 4 via the rotating members 11. Therefore, by rotation of the rotating member 11, it is advantageous that each of the holding portions 7 is able to smoothly move to the opening direction and to the closing direction while in contact with the swing restricting member 4.

According to this embodiment, it is assumed that the robot hand 1 is an inner diameter chuck type hand. Instead, however, the robot hand 1 may be an outer diameter chuck type hand for holding an outer surface of a work piece.

Figure 5:
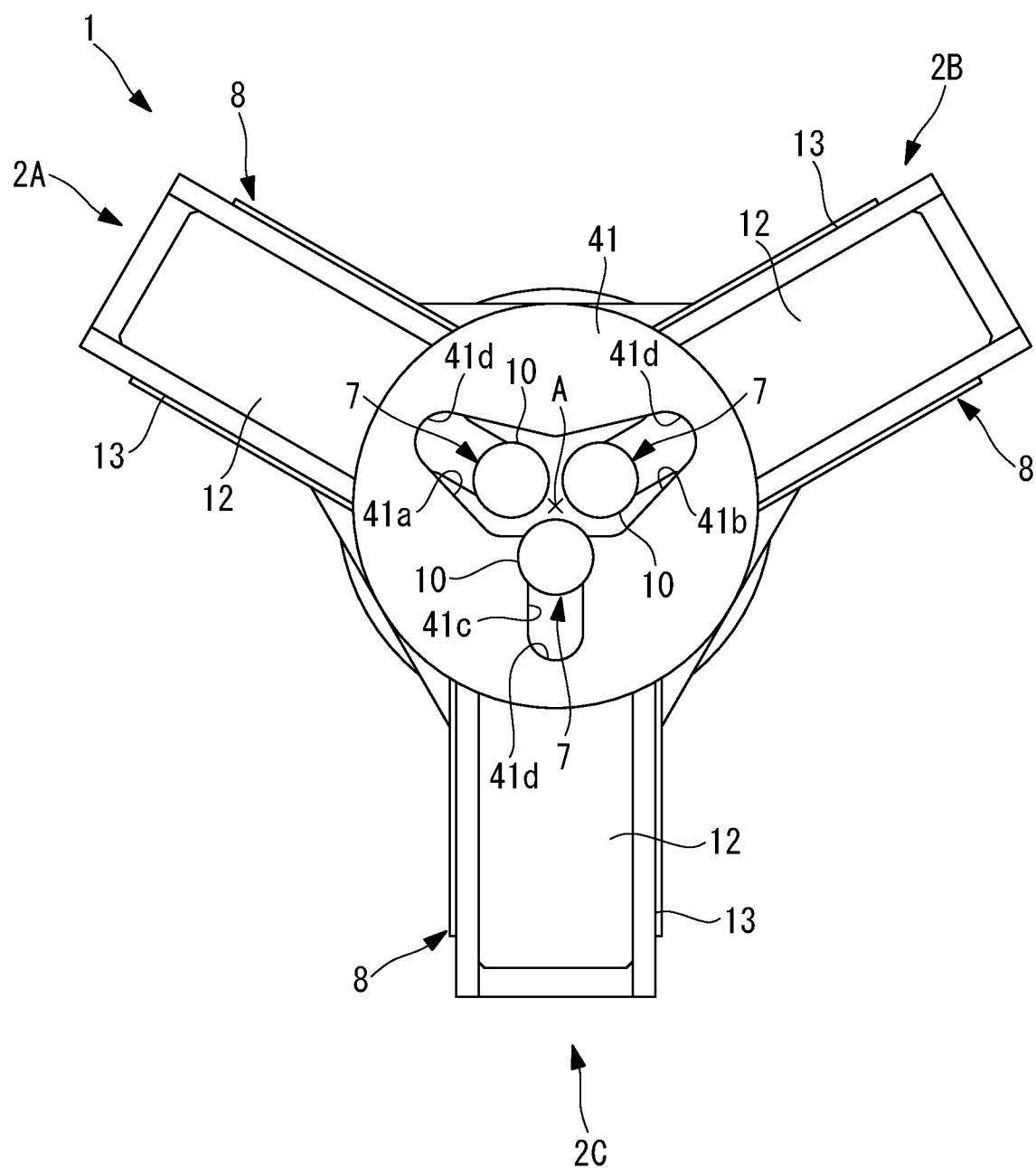
FIG. 5 is a schematic plan view of a modified example of the robot hand in FIG. 1, seen from below.

FIG. 5 shows a swing restricting member 41 of the outer diameter chuck type robot hand 1.

In a planar view seen in the direction along the central axis A, two openings 41a and 41b corresponding to the holding units 2A and 2B take a shape whose width is widened toward the central axis A to form a substantial triangle having one apex positioned on a side opposite of the central axis A. An end portion of each of the openings 41a, 41b, and an opening 41c on the side opposite of the central axis A is a narrowed portion 41d that is closed and whose width is substantially the same width as an outer diameter of the shaft 9. In an opened state in which the three holding portions 7 are located at standby positions that are most distant from the central axis A, the three holding portions 7 are positioned at the narrowed portions 41d of the openings 41a, 41b, and 41c, and prevented from swinging about the central axis A.

In the case in which the hand is of the outer diameter chuck type, the work piece is held by closing the three holding portions 7, in a state in which the three holding portions 7 are positioned outside the work piece, and is released by opening the three holding portions 7. Here, in the process of closing the three holding portions 7, the holding portions 7 of the two holding units 2A and 2B passively swing about the central axis A following a shape of the outer surface of the work piece, thereby the relative positions of the three holding portions 7 are automatically adjusted to appropriate positions according to the shape and dimensions of the work piece. With this, a work piece of various types having an outer surface with different shapes and dimensions may be stably held by the three holding portions 7.

From the above-described embodiments, the following aspects of the present disclosure are derived.

One aspect of the present invention provides a robot hand including: three or more holding portions arranged at intervals from each other along a circumferential direction about a predetermined axis, and configured to hold a work piece; and a driving portion configured to move the three or more holding portions toward a closing direction for approaching the predetermined axis and toward an opening direction for moving away from the predetermined axis, wherein at least one of the holding portions is swingable, about the predetermined axis, at a position at which the at least one holding portion is in contact with the work piece.

A robot hand according to this aspect holds and releases the work piece by opening and closing the three or more holding portions. Specifically, if the hand is of an inner diameter chuck type, an inner surface of the work piece is held by opening the holding portions disposed within the work piece of a tubular shape, and is released by closing the holding portions. If the hand is of an outer diameter chuck type, an outer surface of the work piece is held by closing the holding portions disposed outside the work piece, and is released by opening the holding portions.

According to this aspect, the at least one holding portion is swingable at a position at which the at least different one holding portion is in contact with the work piece. If the hand is of the inner diameter chuck type, the at least different one holding portion is brought into contact with the inner surface of the work piece in a process of movement in the opening direction, and then passively swings following a shape of the inner surface of the work piece while maintaining the contact with the inner surface of the work piece. If the hand is of the outer diameter chuck type, the at least different one holding portion is brought into contact with the outer surface of the work piece in a process of movement in the closing direction, and then passively swings following a shape of the outer surface of the work piece while maintaining the contact with the outer surface of the work piece. By the passive swing of at least one holding portion in this manner, relative positions of the three or more holding portions change according to shape and dimensions of the inner or the outer surface of the work piece. With this, it is possible to adjust positions of holding portions automatically to appropriate positions according to the shape and dimensions of the work piece, and to stably hold work pieces of various types.

In the aspect described above, the at least different one of the holding portions may be unswingable about the predetermined axis at a position at which the at least different one holding portion is in contact with the work piece.

If all of the holding portions are swingable, an excessive bias may occur in the positions of the three or more holding portions while holding the work piece. It is possible to prevent the excessive bias from occurring by making at least one holding portion unable to swing.

In the aspect described above, a swing restricting member configured to restrict swing of the at least one holding portion about the predetermined axis to a predetermined angular range may be further included.

The at least one holding portion swings against an urging force of the urging member when an external force about the predetermined axis is received from the work piece in contact. On the other hand, when an external force from the work piece is not applied upon the at least one holding portion, the at least one holding portion may be maintained at the neutral position by the urging force of the urging member.

In the aspect described above, a swing restricting member configured to restrict swing of the at least one holding portion about the predetermined axis to a predetermined angular range may be further included.

If there is no restriction for the angular range in which the holding portion is able to swing, excessive bias may occur in the positions of the three or more holding portions. It is possible to prevent the occurrence of an excessive bias in the positions of the three or more holding portions by restricting the swing of the holding portion to the predetermined angular range by the swing restricting member.

In the aspect described above, the swing restricting member may include at least one opening through which the at least one holding portion passes in a direction parallel to the predetermined axis, and a width of the opening may gradually change in a manner of decreasing toward the predetermined axis or a manner of increasing toward the predetermined axis.

If the hand is of the inner diameter chuck type, the width of the opening gradually decreases toward the predetermined axis. With this, as the holding portion moves to the opening direction, the angular range in which the holding portion is able to swing increases. If the hand is of the outer diameter chuck type, the width of the opening gradually increases toward the predetermined axis. With this, as the holding portion moves to the closing direction, the angular range in which the holding portion is able to swing increases.

In the aspect described above, the opening may include a narrowed portion at an end thereof positioned at the predetermined axis side in the opening or at an end thereof positioned at an opposite side to the predetermined axis in the opening, wherein the narrowed portion prevents the at least one holding portion from swinging about the predetermined axis.

If the hand is of the inner diameter chuck type, in a standby state in which the holding portion is closed, the at least one holding portion is located at the narrowed portion at an end on the side of the predetermined axis in the opening. If the hand is of the outer diameter chuck type, in the standby state in which the holding portion is opened, the at least one holding portion is located at the narrowed portion at an end on the side opposite of the predetermined axis in the opening. At the narrowed portion, it is possible to prevent the at least one holding portion from swinging about the predetermined axis in both directions. With this, the holding portion in the standby state may be maintained at constant positions.

In the aspect described above, the at least one holding portion may include: a shaft extending in parallel with the predetermined axis; and a rotating member attached to an outer peripheral surface of the shaft, and configured to be rotatable about a longitudinal axis of the shaft, and the rotating member may be disposed at a position corresponding to the opening of the swing restricting member in a direction parallel to the predetermined axis.

According to this configuration, the shaft within the opening is brought into contact with the swing restricting member via the rotating member. By the rotation of the rotating member, the holding portion is able to smoothly move along an edge of the opening to the opening direction and to the closing direction while in contact with the swing restricting member.

According to the aforementioned aspects, it is possible to provide an advantageous effect that a robot hand is capable of stably holding a work piece of different types by automatically adjusting positions of holding portions to appropriate positions according to a shape and dimensions of the work piece.

The invention claimed is:

1. A robot hand comprising:
   three or more holding portions arranged at intervals from each other along a circumferential direction about a predetermined axis, and configured to hold a work piece; and
   a driving portion configured to move the three or more holding portions toward a closing direction for approaching the predetermined axis and toward an opening direction for moving away from the predetermined axis, wherein
   at least one of the holding portions is passively swingable, about the predetermined axis, at a position at which the at least one holding portion is in contact with the work piece.

2. The robot hand according to claim 1, wherein
   at least one of the holding portions is unswingable about the predetermined axis at a position at which the at least one unswingable holding portion is in contact with the work piece.

3. The robot hand according to claim 1, further comprising:
an urging member configured to urge the at least one holding portion to a predetermined neutral position along the circumferential direction.

4. The robot hand according to claim 1, further comprising:
a swing restricting member configured to restrict swinging of the at least one holding portion about the predetermined axis to a predetermined angular range.

5. The robot hand according to claim 4, wherein
the swing restricting member includes at least one opening through which the at least one holding portion passes in a direction parallel to the predetermined axis, and
a width of the opening gradually changes in a manner of decreasing toward the predetermined axis or a manner of increasing toward the predetermined axis.

6. The robot hand according to claim 5, wherein
the opening includes a narrowed portion at an end thereof positioned at the predetermined axis side in the opening or at an end thereof positioned at an opposite side to the predetermined axis in the opening, wherein the narrowed portion prevents the at least one holding portion from swinging about the predetermined axis.

7. The robot hand according to claim 5, wherein
the at least one holding portion includes:
a shaft extending in parallel with the predetermined axis; and
a rotating member attached to an outer peripheral surface of the shaft, and configured to be rotatable about a longitudinal axis of the shaft,
wherein the rotating member is disposed at a position corresponding to the opening of the swing restricting member in a direction parallel to the predetermined axis.

* * * * *